(12) United States Patent
Cibien

(10) Patent No.: US 7,210,567 B2
(45) Date of Patent: May 1, 2007

(54) TRANSMISSION DEVICE FOR TWO OR MORE SHAFTS

(75) Inventor: Angelo Cibien, San Colombano al Lambro (IT)

(73) Assignee: Bi.Ci.Di. s.r.l., Lambro, MI (IT)

( * ) Notice: Subject to any disclaimer, the term of this patent is extended or adjusted under 35 U.S.C. 154(b) by 149 days.

(21) Appl. No.: 11/070,641

(22) Filed: Mar. 2, 2005

(65) Prior Publication Data

US 2005/0211527 A1    Sep. 29, 2005

(30) Foreign Application Priority Data

Mar. 4, 2004   (EP) ................................. 04425143

(51) Int. Cl.
*F16D 41/20*   (2006.01)
*F16D 21/20*   (2006.01)

(52) U.S. Cl. ..................... 192/48.8; 74/650; 192/48.92

(58) Field of Classification Search ..................... None
See application file for complete search history.

(56) References Cited

U.S. PATENT DOCUMENTS

| 2,742,126 | A | * | 4/1956 | Morton ..................... | 192/41 S |
| 2,894,403 | A | * | 7/1959 | Tomko ...................... | 192/41 S |
| 2,941,414 | A | * | 6/1960 | Lee ........................... | 192/81 C |
| 3,304,793 | A | * | 2/1967 | Nishimura ................. | 192/51 |
| 4,278,340 | A | * | 7/1981 | Toyama et al. ........... | 192/48.92 |
| 4,437,552 | A | * | 3/1984 | Toyama ..................... | 192/48.92 |
| 4,825,988 | A | * | 5/1989 | Nishimura ................. | 192/81 C |
| 4,986,400 | A |   | 1/1991 | Heller |   |

FOREIGN PATENT DOCUMENTS

| DE | 324 694 C | 9/1920 |
| FR | 2 745 348 A | 8/1997 |
| WO | 95/34765 A | 12/1995 |

* cited by examiner

*Primary Examiner*—Rodney H. Bonck
(74) *Attorney, Agent, or Firm*—Volpe and Koenig P.C.

(57) ABSTRACT

A transmission device for two or more shafts is provided having two first cylindrical sleeves which are connected to the first shaft and can be mechanically coupled or uncoupled with two second cylindrical sleeves connected to the second shaft or to a third shaft aligned with the second shaft, by tightening or loosening, respectively, two helical springs arranged in a substantially coaxial manner astride these cylindrical sleeves. Two control collars are mechanically coupled with two tubular members, so that the mutual translation of the control collars with respect to the tubular members also causes their mutual rotation, the ends of the helical springs being arranged into seats made in the control collars and in the tubular members so that their mutual rotation tightens or loosens the coils of the helical springs, thereby causing the coupling or the uncoupling, respectively, between the first cylindrical sleeves and the second cylindrical sleeves.

12 Claims, 5 Drawing Sheets

TRANSMISSION DEVICE FOR TWO OR MORE SHAFTS

FIELD OF THE INVENTION

The present invention relates to a transmission device for two or more shafts, and in particular to a clutch-type mechanical transmission device with helical springs for transmitting a torque from a shaft to one or more shafts.

BACKGROUND

Italian patent 1311501 and WO95/34765 disclose transmission devices which comprises a first cylindrical sleeve which can be mechanically coupled or uncoupled with a second cylindrical sleeve by tightening or loosening, respectively, a helical spring arranged in a substantially coaxial manner astride these two cylindrical sleeves, wherein a control collar is mechanically coupled with a tubular member, so that the mutual translation of the control collar with respect to the tubular member also causes their mutual rotation, the ends of the helical springs being arranged into seats made in the control collar and in the tubular member so that their mutual rotation tightens or loosens the coils of the helical spring, thereby causing the coupling or the uncoupling, respectively, between the first cylindrical sleeve and the second cylindrical sleeve.

The torque which can be transmitted by this known device depends on the force exerted by the helical spring on the outer walls of the two cylindrical sleeves, i.e. depends substantially on the size of the spring, so that it is necessary to enlarge the whole device for transmitting high torques, with consequent size problems of the same device.

U.S. Pat. No. 4,986,400 and U.S. Pat. No. 4,825,988 disclose transmission devices with two pairs of cylindrical sleeves, two control collars and two helical springs, which however cannot transmit high torques, since the helical springs have the same coiling direction, so that they cannot be tightened at the same time on both pairs of sleeves.

SUMMARY OF THE INVENTION

It is therefore an object of the present invention to provide a transmission device which is free from said disadvantages, i.e. a compact device which can transmit high torques. Said object is achieved with a device, the main features of which are disclosed in the first claim and other features are disclosed in the subsequent claims.

Thanks to the further cylindrical sleeves, helical spring, control collar and tubular member, the device according to the present invention can transmit higher torques with respect to said known device, even if it has a relatively compact size. As a matter of fact, the particular arrangement of the additional members does not constitute a simple doubling of the known device, since the synergic effect of the two sets of mechanical members mutually connected in a coaxial manner allows to transmit remarkably higher torques in a compact container, i.e. smaller than a known device which can transmit an equivalent torque.

According to a particular aspect of the invention, the helical springs are arranged with opposite coiling directions, so as to increase the force exerted on the cylindrical sleeves, i.e. the maximum transmissible torque.

According to another particular aspect of the invention, the transmission member and the first cylindrical sleeves are provided with an axial hole in which the second and/or the third shaft are arranged in a rotating manner, so as to exploit these shafts as supports for the transmission member and the first cylindrical sleeves in order to save space and increase the compactness of the device.

According to a further particular aspect of the invention, the control collars of the helical springs can be driven in an independent manner by as many control levers, so that it is possible to manually adjust the torque which can be transmitted from the first to the second shaft, i.e. from the drive shaft to the driven shaft.

Furthermore, the device according to the present invention can be employed for transmitting not only a high torque to a single shaft but also a lower torque to two mutually aligned shafts, simply by substituting the driven shaft with two shafts having the same diameter. The transmission device can thus be easily adapted for working as a differential, thereby keeping their mechanical components unaltered.

Thanks to the particular conformation of the container and/or to the particular mutual arrangement of the shafts and the mechanical members in this container, the device according to the present invention can be easily mounted and maintained and has a minimum overall size.

BRIEF DESCRIPTION OF THE DRAWINGS

Further advantages and features of the device according to the present invention will become clear to those skilled in the art from the following detailed and non-limiting description of two embodiments thereof with reference to the attached drawings, wherein.

DETAILED DESCRIPTION OF THE PREFERRED EMBODIMENTS

Figure 1:
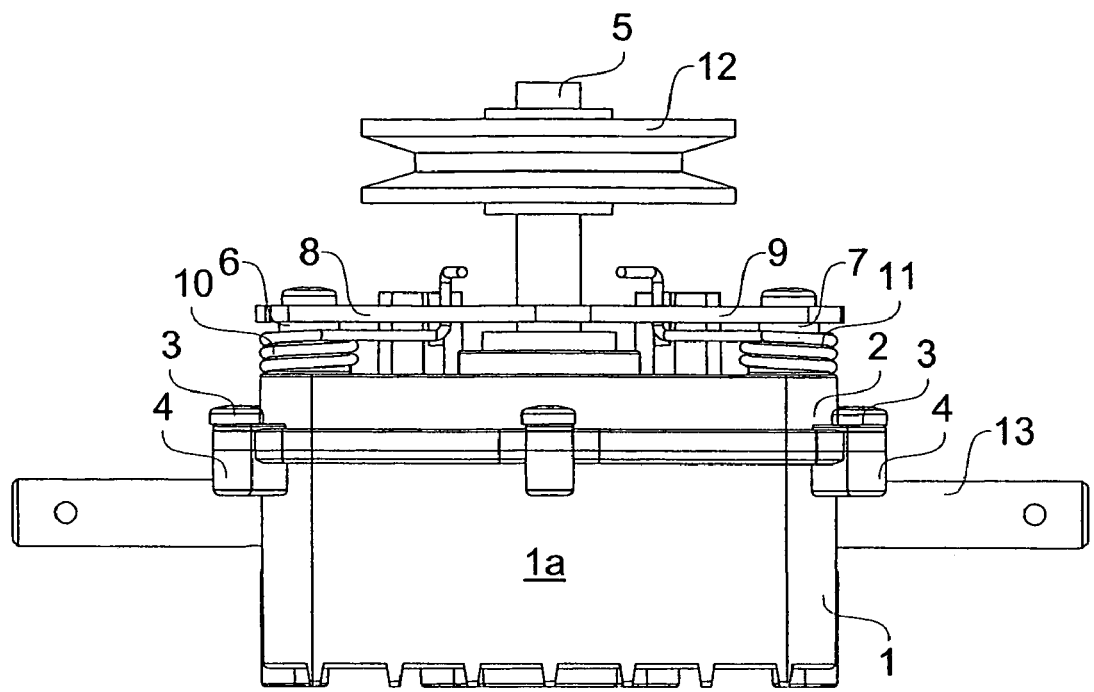
FIG. 1 shows a front view of the first embodiment of the device.
Figure 2:
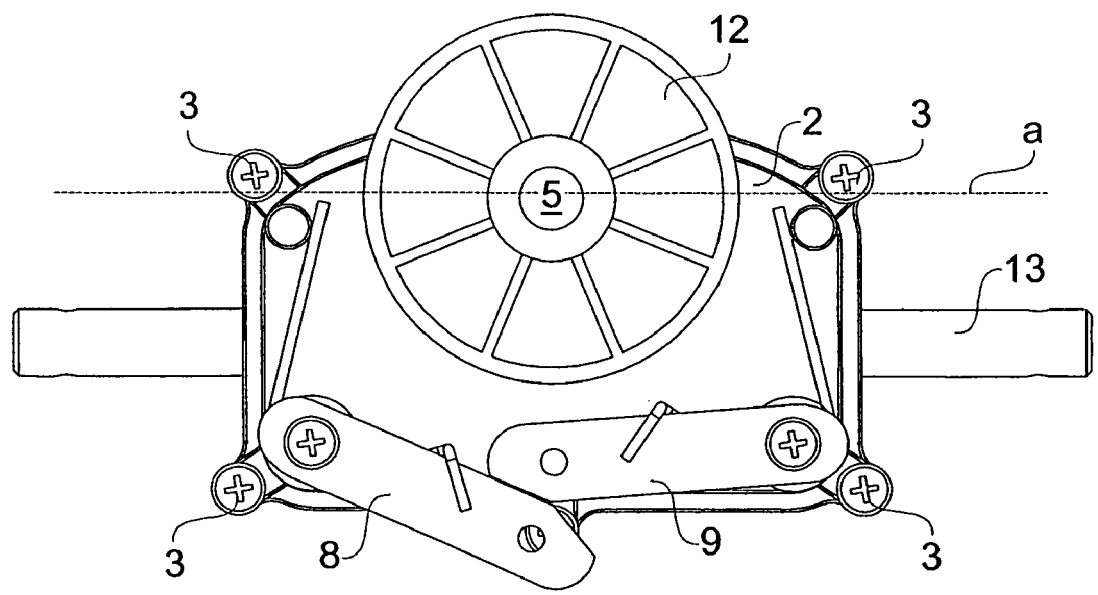
FIG. 2 shows a top view of the device of FIG. 1.
Figure 3:
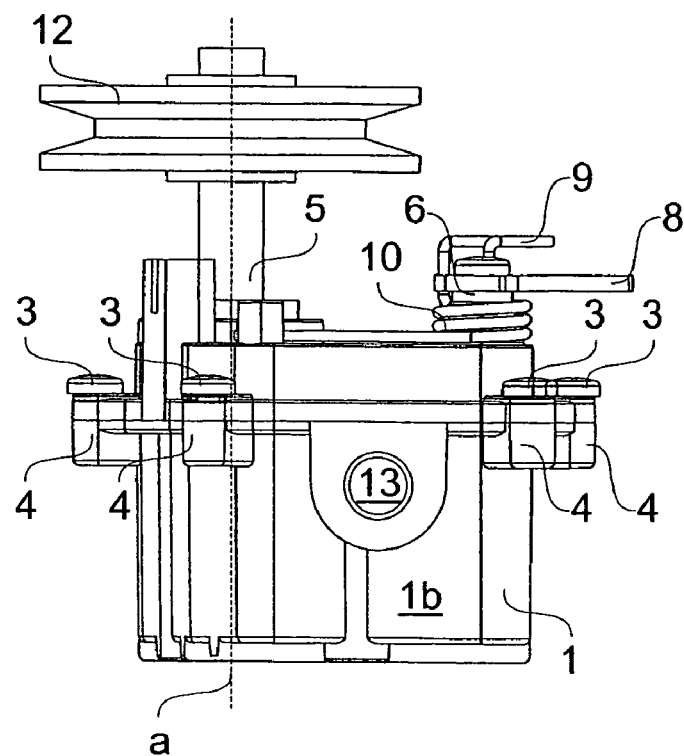
FIG. 3 shows a side view of the device of FIG. 1.

Referring to FIGS. 1 to 3, it is seen that the device according to the present invention comprises a container 1 which is closed by an upper cover 2 by means of a plurality of screws 3 inserted into corresponding seats 4 arranged along the upper edges of container 1. The container has a substantially prismatic shape with a pentagonal base, wherein the front wall 1a is substantially perpendicular to the two lateral walls 1b. Cover 2 is provided with a hole in which a first shaft 5 is inserted, in particular a drive shaft, as well as with two other holes, close to the front wall 1a, in which two control shafts 6, 7 are inserted. Control levers 8, 9 urged outside container 1 by springs 10, 11 can be keyed on these control shafts 6, 7, while a transmission member 12, for example a pulley, can be keyed on the drive shaft 5. A second shaft 13, in particular a driven shaft, is instead arranged perpendicular to shaft 5 and crosses both lateral walls 1b of container 1. The first shaft 5 is preferably arranged in the middle of a plane a passing across the corners comprised between the lateral walls 1b and the rear walls of container 1. Seats 4 for screws 3 are arranged on the five corners of containers and in the middle of the front wall 1a.

Figure 4:
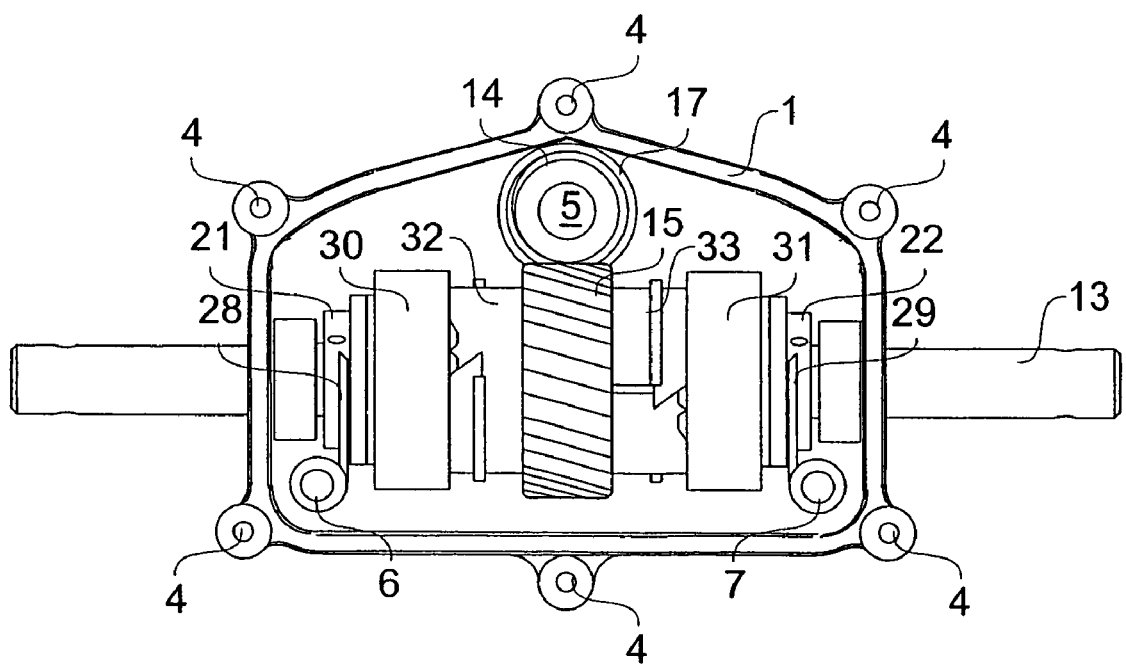
FIG. 4 shows a first top view of the device of FIG. 1 with the opened cover.
Figure 5:
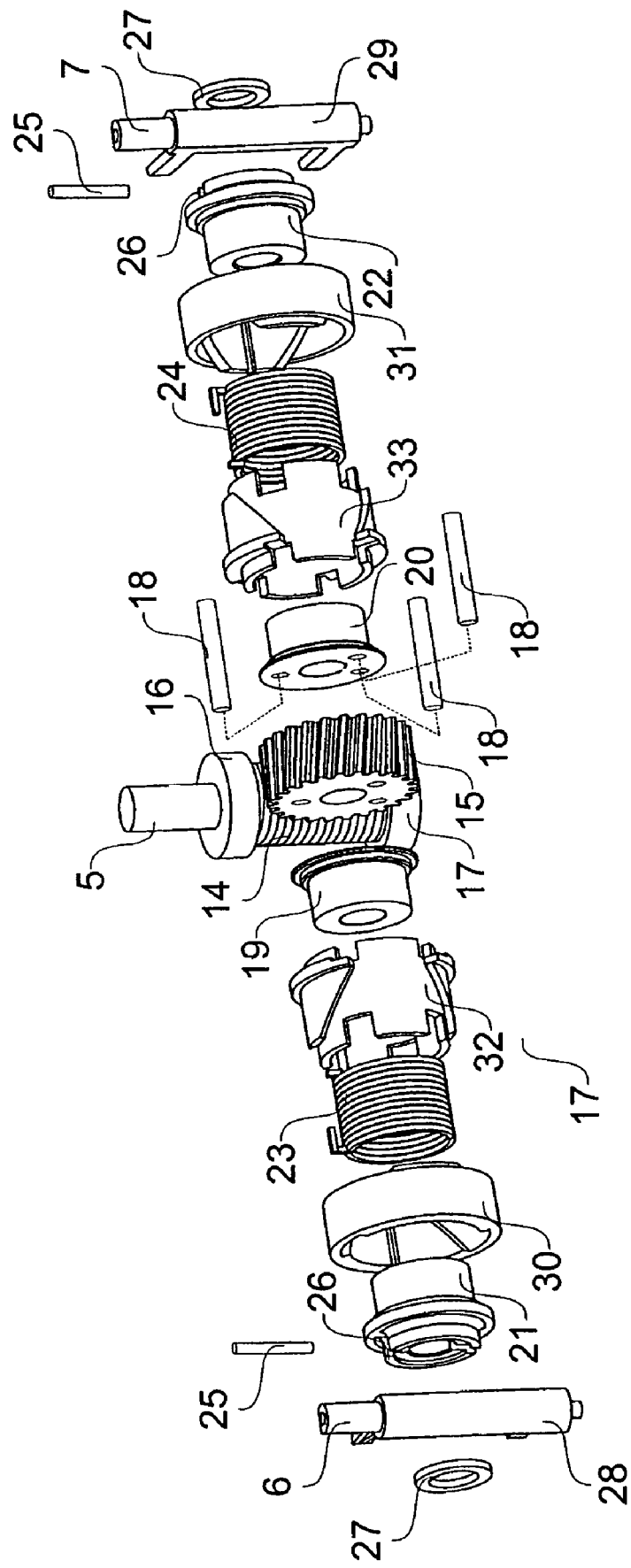
FIG. 5 shows an exploded view of the inner mechanism of the device of FIG. 1.

Referring to FIGS. 4 and 5, it is seen that a worm screw 14 mechanically coupled with a cogwheel 15 provided with an axial hole, in which the second shaft 13 (not shown in FIG. 5) is arranged in a rotating manner, is keyed on the first shaft 5, which is kept in position in container 1 by a pair of bearings 16, 17. Cogwheel 15 is provided with a plurality of longitudinal holes in which longitudinal pins 18 are inserted. The ends of pins 18 are in turn inserted into longitudinal holes made in a pair of first cylindrical sleeves 19, 20 (not visible in FIG. 4) arranged in a coaxial manner at both sides of cogwheel 15, so that these sleeves rotate together with cogwheel 15. Also the first cylindrical sleeves 19, 20 are provided with an axial hole in which the second shaft 13 is arranged in a rotating manner. The first cylindrical sleeves 19, 20 can be mechanically coupled or uncoupled with a second pair of cylindrical sleeves 21, 22 by tightening or loosening, respectively, helical springs 23, 24 arranged in a substantially coaxial manner astride a first cylindrical sleeve 19 or 20 and a second cylindrical sleeve 21 or 22. The second sleeves 21, 22 are provided with an axial hole, so that they can be keyed on shaft 13 by means of transversal pins 25 inserted into transversal holes made in shaft 13, as well as into transversal seats 26 made into the second sleeves 21, 22 and laterally closed by washers 27. The coils of the helical springs 23, 24 are suitably arranged with opposite coiling directions, i.e. clockwise and anticlockwise.

For uncoupling a first cylindrical sleeve 19 or 20 from a second cylindrical sleeve 21 or 22, it is sufficient to pull the control lever 8 or 9, so as to rotate the control shaft 6 or 7, which is connected, in particular is integral, with a control fork 28 or 29 arranged astride the second cylindrical sleeve 21 or 22. The rotation of the control fork 28 or 29 causes the axial shifting of a control collar 30 or 31, which is mechanically coupled with a tubular member 32 or 33 so that the mutual translation of the control collar 30 or 31 with respect to member 32 or 33 causes also their mutual rotation. The ends of the helical springs 23, 24 are arranged in seats made in the control collars 30, 31 and in the tubular members 32, 33, so that their mutual rotation tightens or loosens the coils of the helical springs 23, 24, thereby causing the coupling or the uncoupling, respectively, between the first sleeves 19, 20 and the second sleeves 21, 22. The mechanical coupling between the control collars 30, 31, the tubular members 32, 33 and the helical springs 23, 24 is carried out with suitable protrusions and cavities of the control collars 30, 31 and of the tubular members 32, 33, for example as described more in detail in the Italian patent 1311501.

Figure 6:
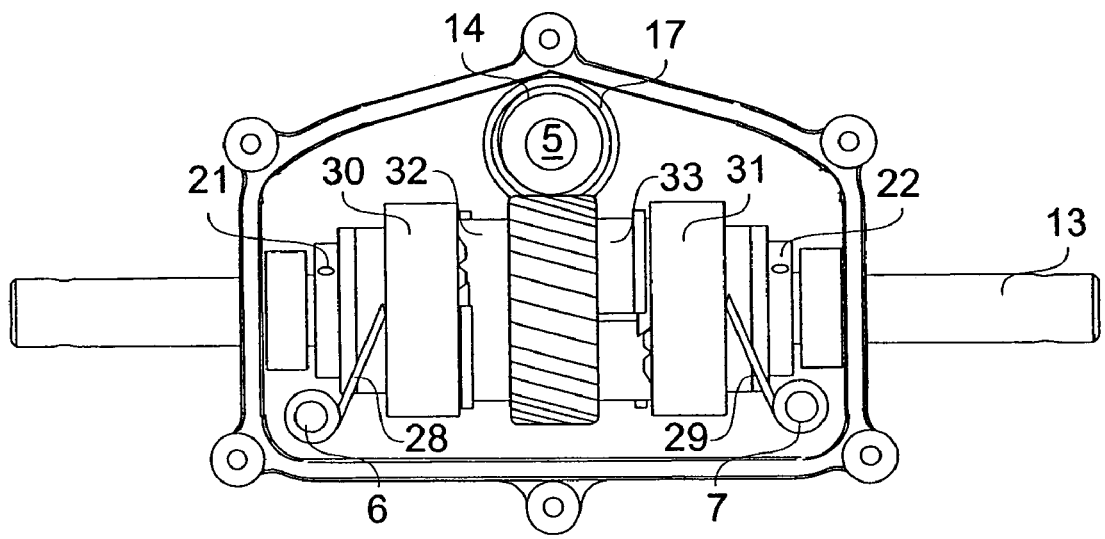
FIG. 6 shows a second top view of the device of FIG. 1 with the opened cover.

FIG. 6 shows both the control forks 28, 29 with push the control collars 30, 31 for mechanically uncoupling the first shaft 5 from the second shaft 13. If only one of the control forks 28 or 29 is moved, shaft 5 is coupled with shaft 13 but the maximum torque that can be transmitted is lower.

Figure 7:
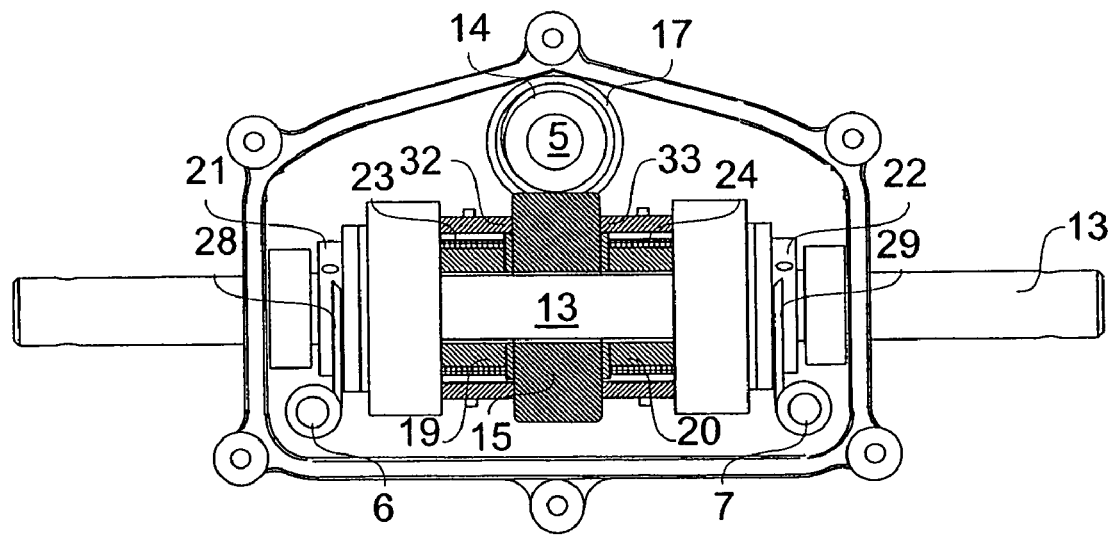
FIG. 7 shows a first partially sectioned top view of the device of FIG. 1.

FIG. 7 shows the first shaft 5 coupled with the second shaft 13 thanks to the helical springs 23, 24 which clench the outer surface of the first sleeves 19 and 20, which are fixed to cogwheel 15 engaged with the worm screw 14 keyed on the first shaft 5, as well as of the second sleeves 21 and 22, which are keyed on the second shaft 13.

Figure 8:
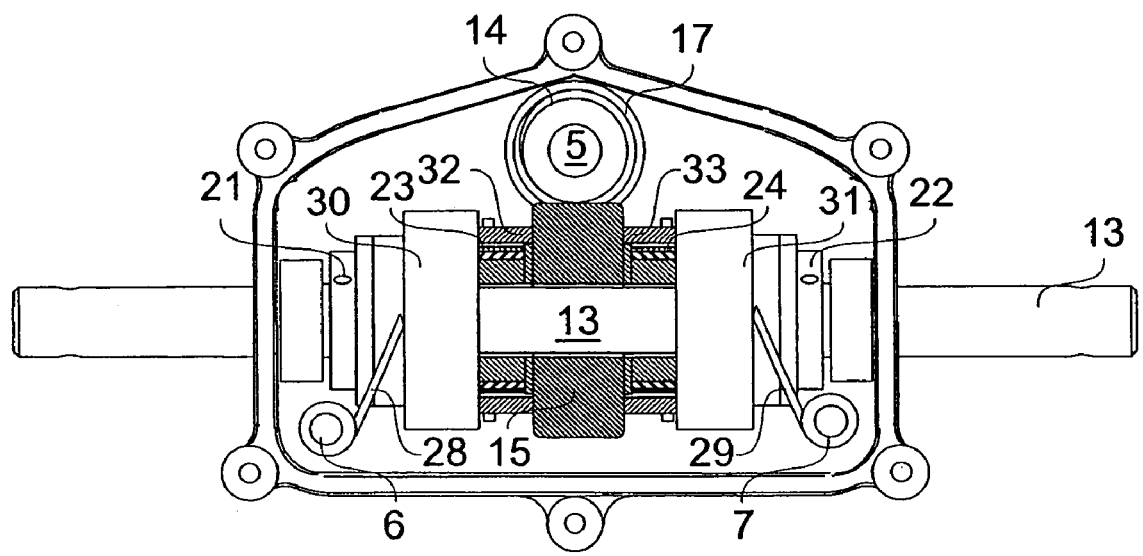
FIG. 8 shows a second partially sectioned top view of the device of FIG. 1.

FIG. 8 shows shaft 5 uncoupled from shaft 13, since the helical springs 23, 24, loosened due to the mutual rotatory and translatory motion between the control collars 30, 31 and the tubular members 32, 33, do not urge onto the outer surface of sleeves 19, 20, 21 and 22.

Figure 9:
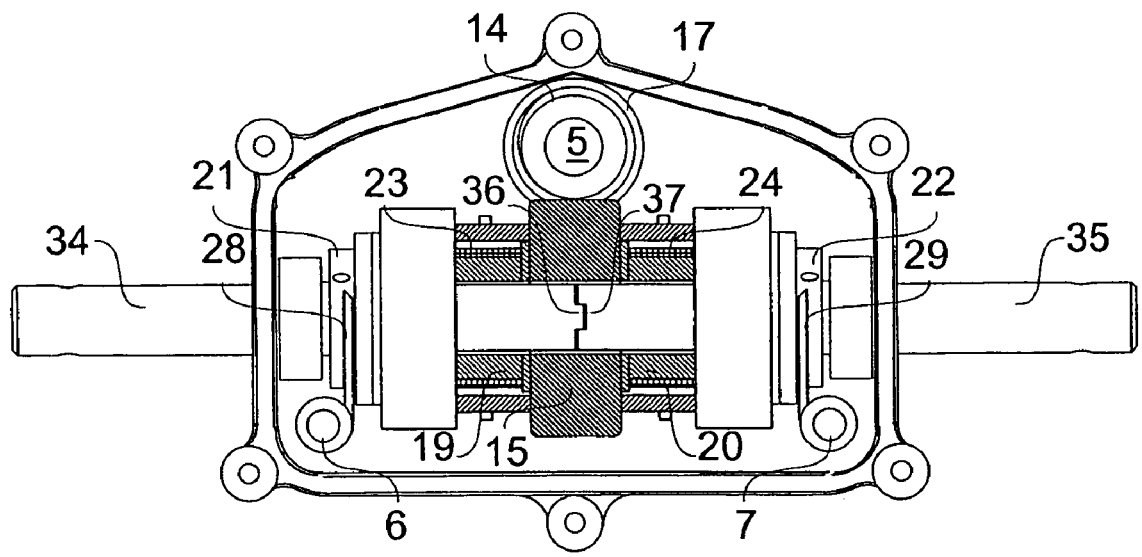
FIG. 9 shows a partially sectioned top view of the second embodiment of the device.

Finally, FIG. 9 shows a second embodiment, similar to the first one, in which the second cylindrical sleeves are keyed on two mutually aligned shafts 34, 35, arranged instead of shaft 13, so that the rotation of shafts 34, 35 is independent since it depends on the coupling of the first cylindrical sleeve 19 with the second cylindrical sleeve 21 or of the first cylindrical sleeve 20 with the second cylindrical sleeve 22, respectively. The end of shaft 34 arranged in container 1 is preferably provided with an axial pin 36 inserted into a corresponding axial hole 37 made in the adjacent end of shaft 35, so as to keep shafts 34 and 35 mutually aligned. Pin 36 and hole 37 are preferably arranged in the axial hole of cogwheel 15.

Possible modifications and/or additions may be made by those skilled in the art to the hereinabove described and illustrated embodiment while remaining within the scope of the same invention.

What is claimed is:

1. Transmission device for two or more shafts, which comprises a first cylindrical sleeve which is connected to a first shaft and can be mechanically coupled or uncoupled with a second cylindrical sleeve connected to a second shaft, by tightening or loosening, respectively, a first helical spring arranged in a substantially coaxial manner astride the two cylindrical sleeves, a first end of the first helical spring being arranged into a seat in a control collar for coupling or uncoupling the first cylindrical sleeve with the second cylindrical sleeve, wherein a transmission member mechanically connected to the first shaft is fixed between the first cylindrical sleeve and a further first cylindrical sleeve which can be mechanically coupled or uncoupled with a further second cylindrical sleeve connected to the second shaft or to a third shaft aligned with the second shaft, by tightening or loosening, respectively, a second helical spring arranged in a substantially coaxial manner astride these two further first and second cylindrical sleeves, a first end of the second helical spring being arranged into a seat in a second control collar for coupling or uncoupling the further first cylindrical sleeve with the further second cylindrical sleeve, wherein the first and second control collars are mechanically coupled with first and second tubular members, respectively, so that the mutual translation of a control collar with respect to the corresponding tubular member also causes their mutual rotation, wherein the second ends of the helical springs are arranged into a seat in the tubular members so that the mutual rotation of a first or second control collar with respect to the corresponding tubular member tightens or loosens the coils of the corresponding helical spring, the coils of the helical springs being arranged with opposite coiling directions.

2. Device according to claim 1, wherein said transmission member and said first cylindrical sleeves are provided with an axial hole in which the second shaft and/or the third shaft are arranged in a rotating manner.

3. Device according to claim 1, wherein said transmission member comprises a cogwheel mechanically coupled with a worm screw keyed on the first shaft.

4. Device according to claim 3, wherein said cogwheel is provided with a plurality of longitudinal holes in which longitudinal pins are inserted, the ends of which are inserted into longitudinal holes made in the first cylindrical sleeves, so that these sleeves rotate together with the cogwheel.

5. Device according to claim 1, wherein both second cylindrical sleeves are keyed on the second shaft.

6. Device according to claim 1, wherein the second cylindrical sleeves are keyed on the second shaft and on the third shaft.

7. Device according to claim 6, wherein an end of the second shaft is provided with an axial pin inserted into a corresponding axial hole made in the adjacent end of the third shaft.

8. Device according to claim 7, wherein said axial pin and said axial hole are arranged in the axial hole of the cogwheel.

9. Device according to claim 1, wherein all the cylindrical sleeves, the helical springs and the transmission member are arranged into a container which is closed by an upper cover provided with a hole in which the first shaft is inserted, as well as two holes in which two control shafts connected to control forks arranged astride the second cylindrical sleeves are inserted, so as to rotate for axially shifting the control collars, wherein the second shaft andlor the third shaft are perpendicular to the first shaft and cross lateral walls of the container.

10. Device according to claim 9, wherein said container has a substantially prismatic shape with a pentagonal base, wherein a front wall is substantially perpendicular to the lateral walls and the first shaft is arranged in the middle of a plane passing across the corners comprised between the lateral walls and rear walls of the container.

11. Device according to claim 10, wherein the control levers keyed on the control shafts are urged outside the container by springs.

12. Device according to claim 1, wherein the first shaft is a drive shaft and the second shaft and/or the third shaft are driven shafts.

* * * * *

UNITED STATES PATENT AND TRADEMARK OFFICE
CERTIFICATE OF CORRECTION

PATENT NO. : 7,210,567 B2  Page 1 of 1
APPLICATION NO. : 11/070641
DATED : May 1, 2007
INVENTOR(S) : Angelo Cibien It is certified that error appears in the above-identified patent and that said Letters Patent is hereby corrected as shown below:

ON THE FACE PAGE

At section (73), Assignee:, page 1, left column, after "Bi.Ci.Di. s.r.l.", delete "Lambro MI (IT)", and insert --San Colombano al Lambro, Italy--.

Signed and Sealed this

Seventeenth Day of March, 2009

JOHN DOLL
*Acting Director of the United States Patent and Trademark Office*